(12) United States Patent
Akella et al.

(10) Patent No.: US 7,929,645 B2
(45) Date of Patent: Apr. 19, 2011

(54) METHOD AND APPARATUS FOR CHANNEL ESTIMATION IN OFDM RECEIVERS

(75) Inventors: Rama Akella, Carlsbad, CA (US); Roger Cheng, Hong Kong (CN)

(73) Assignee: MaxLinear, Inc., Carlsbad, CA (US)

(*) Notice: Subject to any disclaimer, the term of this patent is extended or adjusted under 35 U.S.C. 154(b) by 513 days.

(21) Appl. No.: 11/870,726

(22) Filed: Oct. 11, 2007

(65) Prior Publication Data

US 2008/0112494 A1   May 15, 2008

Related U.S. Application Data

(60) Provisional application No. 60/829,131, filed on Oct. 11, 2006.

(51) Int. Cl.
   *H04L 27/06* (2006.01)
(52) U.S. Cl. ........ 375/340; 375/260; 370/203; 370/204; 370/206; 370/208; 370/210
(58) Field of Classification Search .......... 375/260, 375/340; 370/203, 206, 208, 210, 480
See application file for complete search history.

(56) References Cited

U.S. PATENT DOCUMENTS

| 6,487,253 | B1 | 11/2002 | Jones, IV et al. |
| 6,904,078 | B1 * | 6/2005 | Abeta et al. ............ 375/141 |
| 7,466,778 | B2 * | 12/2008 | Ananth et al. ............ 375/347 |
| 7,660,229 | B2 * | 2/2010 | Papasakellariou et al. ... 370/203 |
| 2003/0198201 | A1 | 10/2003 | Ylitalo et al. |

OTHER PUBLICATIONS

International Search Report of the International Searching Authority for Application No. PCT/US2007/081136, mailed on Mar. 17, 2008, 1 page.
Written Opinion of the International Searching Authority for Application No. PCT/US2007/081136, mailed on Mar. 17, 2008, 4 pages.
Preliminary Report on Patentability for Application No. PCT/US2007/081136, mailed on Apr. 15, 2009, 5 pages.

* cited by examiner

*Primary Examiner* — David C Payne
*Assistant Examiner* — Leon Flores
(74) *Attorney, Agent, or Firm* — Kilpatrick Townsend & Stockton LLP

(57) ABSTRACT

An efficient channel estimation system and method provides good performance under high Doppler conditions and is suitable for OFDM systems such as DVB-T. A number of different pilot interpolations techniques enable the estimation of channel for the OFDM systems. For 2k and 4k modes, the channel is estimated using the preceding symbol, the present symbol, and two succeeding symbols. For an 8k mode, only one future symbol is used to estimate the channel.

16 Claims, 3 Drawing Sheets

METHOD AND APPARATUS FOR CHANNEL ESTIMATION IN OFDM RECEIVERS

CROSS-REFERENCES TO RELATED APPLICATIONS

The present application claims benefit under 35 USC 119 (e) of U.S. provisional application No. 60/829,131, filed Oct. 11, 2006, entitled "Method And Apparatus For Channel Estimation In OFDM Receivers", the content of which is incorporated herein by reference in its entirety.

BACKGROUND OF THE INVENTION

Signal processing systems such as communication receivers often must recover a desired signal which has been transmitted through a channel degraded by multipath. In order to compensate for the signal impairment introduced thereby, receivers can use signal processing techniques which estimate the channel conditions. However, this poses challenges for channels which are changing quickly, as is the case, for example, when the receiver is mobile and moving at high speed, i.e., due to high Doppler conditions.

Orthogonal frequency division multiplexing (OFDMA) systems, such as DVB-T often provide pilot tones for the purpose of making channel estimation easier. However, the sparseness of these tones renders it difficult to estimate the channel quickly and with efficient memory usage and calculations.

FIG. 1 is a high-level block diagram of an OFDM system which employs channel estimation, as known in the prior art. Data modulated by modulator 120 and pilot tones 122 are inserted in inverse Fourier transform block 102. Block 104 adds cyclic prefix to the output of inverse Fourier transform block 102 and supplies its output to Rayleigh channel 106. The pilot tones are interspersed periodically in the subchannels to enable channel estimation block for the Rayleigh channel 106. Signal $s_m$ received by Rayleigh channel 106 for transmission may be defined as shown below:

$$s_m(t) = \sum_{k=0}^{N-1} a_{k,m} e^{j2\pi k \Delta ft}, mT_S \leq t < (m+1)T_S \quad (1)$$

After the Rayleigh channel, the received signal is defined as below:

$$r_m = s_m(t) \otimes h(t) \quad (2)$$

where the channel response h(t) is defined as:

$$h(t, \tau) = \sum_k \gamma_k(t) \delta(\tau - \tau_k) \quad (3)$$

In the frequency domain, the received signal can be expressed as $$x_{l,n} = H_{l,n} a_{l,n} + w_{l,n} \quad (4)$$

where $$H_{l,n} = \Sigma \gamma_k e^{-j2\pi f \tau_k} \quad (5)$$

is the frequency response and $w_{l,n}$ represents the Additive White Gaussian Noise (AWGN). For the pilot subcarriers, the temporal channel can be obtained in accordance with the following expression:

$$\hat{H}_{l,n} = x_{l,n} a^*_{l,n} = H_{l,n} + w_{l,n} a^*_{l,n} \quad (6)$$

Block 108 removes the cyclic prefix from the received signal. Fast Fourier transform block 110 converts the time domain signal supplied by block 108 to a frequency domain signal. Block 112 extracts the pilot symbols from the signal supplied by block 110 to estimate the channel. In the above representation, the channel is assumed to be an ideal channel plus noise. To estimate the channel, the noise is suppressed and pilot interpolation is performed.

FIG. 2 shows how pilot channels are distributed among subchannels in the DVB-T/H system. DVB-T supports 2K and 8K OFDM subchannels, whereas DVB-H also supports a mode with 4K subchannels. With each successive symbol, the location of most of the pilot tones (alternatively referred to herein as pilots) changes, with the exception of the pilot tones at locations called continuous pilot locations. In this system, the pilots are inserted every 12 subcarriers in the frequency domain; this density of pilot tones is insufficient for noise suppression. One method for increasing the density of channel estimates is to use pilot tones located nearby in time and frequency to interpolate the values in between. This can be done using previous and future OFDM symbols to fill the pilots from 1/12 total subcarrier density to 1/3 total subcarrier density. However, conventional interpolation techniques are inefficient and require excessive amount of memory space to store data required to perform such interpolations.

BRIEF SUMMARY OF THE INVENTION

In accordance with one embodiment of the present invention, to estimate a channel associated with 2k and 4k modes, diagonal pilot positions are first used to obtain the pilots at the center between each two original pilots in accordance with the expression shown below:

$$\hat{P}_{l+1,i+9} = C_7 P_{l+2,i+6} + C_8 P_{l,i+12}$$

Subsequently, using two pilots, linear interpolation is performed in accordance with the expressions shown below:

$$\hat{P}_{l,i+3} = C_1 \hat{P}_{l-1,i+3} + C_2 P_{l+1,i+3}$$

$$\hat{P}_{l,i+6} = C_3 \hat{P}_{l-1,i+9} + C_4 P_{l+1,i+3}$$

$$\hat{P}_{l,i+9} = C_5 \hat{P}_{l-1,i+9} + C_6 \hat{P}_{l+1,i+9}$$

$i = 3*(l \bmod 4) + 12n$, for n integer, $n \geq 0$.

where l represents an index of a symbol and i represents the position of the pilot tones within the symbol.

In accordance with another embodiment of the present invention, to estimate a channel associated with an 8k mode, the following expressions are used to interpolate pilot positions:

$$\hat{P}_{l,i+3} = C_1 \hat{P}_{l-1,i+3} + C_2 P_{l+1,i+3}$$

$$\hat{P}_{l,i+6} = C_3 \hat{P}_{l-1,i+9} + C_4 P_{l+1,i+3}$$

$$\hat{P}_{l,i+9} = C_5 \hat{P}_{l-1,i+9} + C_6 \hat{P}_{l+1,i+9}$$

Where $$\hat{P}_{l+1,i+9} = C_7 P_{l+1,i+3} + C_8 P_{l+1,i+15}$$

$i = 3*(l \bmod 4) + 12n$, for n integer, $n \geq 0$

DETAILED DESCRIPTION OF THE INVENTION

A channel estimation system and method, in accordance with the present invention, is highly efficient and provides good performance under high Doppler conditions, particularly suitable for OFDM systems such as DVB-T. A number of different pilot symbols interpolation techniques are disclosed that enable the estimation of channel OFDM systems (such as DVB-T), well suited for mobile conditions via which signals are transmitted. The present invention may be used in digital receivers in standards which use OFDM systems. Such systems include, but are not limited to, DVB-T, ISDB-T, T-DMB, or DMB-T/H. The present invention enables reception of, for example, digital television signals based on these standards while the viewer is moving at high speeds relative to the transmitter.

In the following, both causal and non-causal interpolation techniques are described to increase pilot density in the frequency domain. Each techniques uses only a few pilot tones, resulting in simplicity of calculation, efficient implementation, and consumption of less memory space. In the following: (i) symbol ^ is used to indicate an estimated pilot symbol, (ii) black circles represent pilot tones, (iii) white circles represent data tones (iv) cross-hatched circles represent estimated symbols, (v) l is the index of the symbol shown along the y-axis, (vi) and i is the pilot position in the current symbol shown along the x-axis.

Interpolation Technique No. 1

Figure 1:
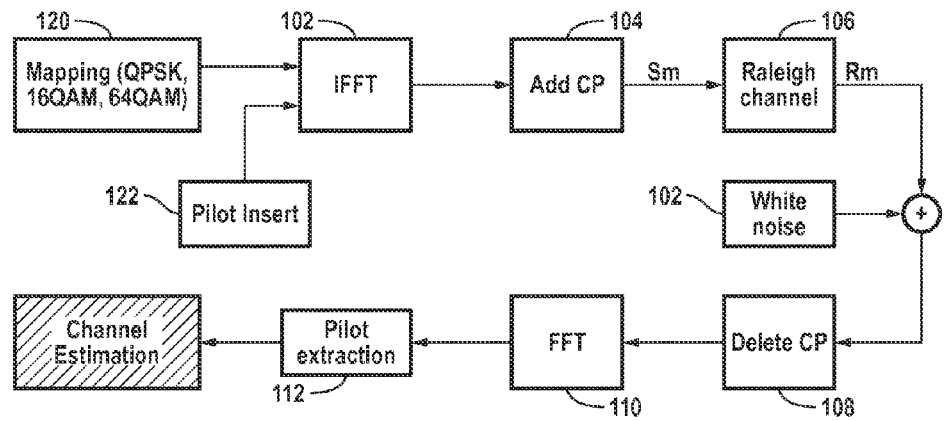
FIG. 1 is a high-level block diagram of an OFDM system which uses channel estimation, as known in the prior art.
Figure 2:
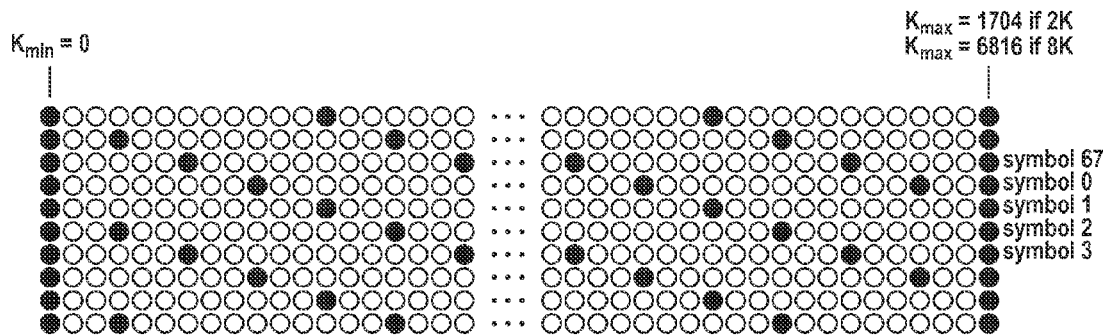
FIG. 2 shows the distribution of pilot channels among subchannels in accordance with the DVB-T/H system, known in the prior art.
Figure 3:
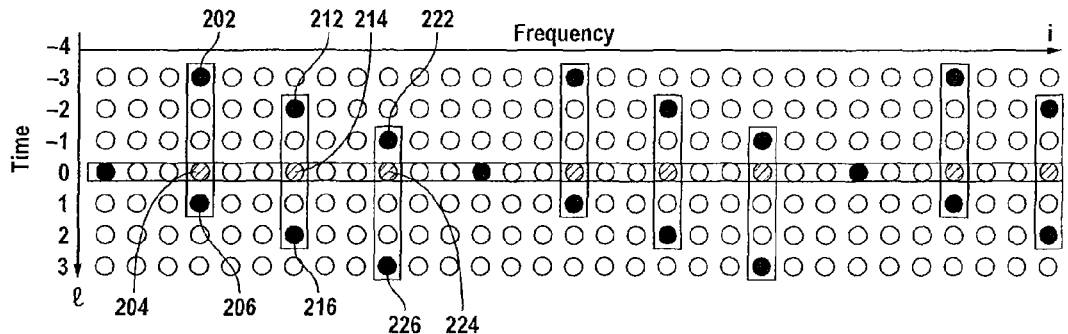
FIG. 3 shows the pilot symbols used to perform interpolation, in accordance with one embodiment of the present invention.

In accordance with one embodiment of the present invention and as shown in FIG. 3, previous and future pilots in time domain are used to do linear interpolation, in accordance with the following expressions:

$$\hat{P}_{l,i+3}=C_1 P_{l-3,i+3}+C_2 P_{l+1,i+3} \quad (7)$$

$$\hat{P}_{l,i+6}=C_3 P_{l-2,i+6}+C_4 P_{l+2,i+6} \quad (8)$$

$$\hat{P}_{l,i+p}=C_5 P_{l-1,i+9}+C_6 P_{l+3,i+9} \quad (9)$$

$i=3*(l \bmod 4)+12n$, for $n$ integer, $n \geq 0$.

In other words, pilot position i+3 of a current symbol, i.e. $\hat{P}_{l,i+3}$, is estimated as being equal to a weighted average of the similar pilot positions of the succeeding symbol (the symbol whose index is one higher than the index of the current symbol), i.e. $P_{l+1,i+3}$, and the third preceding symbol (the symbol whose index is one less than the index of the current symbol by 3), i.e. $P_{l-3,i+3}$. For example, pilot 204 ($\hat{P}_{l,i+3}$) is estimated by interpolating pilot symbols 206 ($P_{l+1,i+3}$) and pilot symbol 202 ($P_{l-3,i+3}$) in accordance with expression (7) shown above.

Pilot position i+6 of a current symbol, i.e. $\hat{P}_{l,i+6}$, is defined as being equal to a weighted average of the similar pilot positions of the second succeeding symbol (the symbol whose index is two higher than the index of the current symbol), i.e. $P_{l+2,i+6}$, and the second preceding symbol (the symbol whose index is two less than the index of the current symbol), i.e. $P_{l-2,i+6}$. For example, pilot 214 ($\hat{P}_{l,i+6}$) is estimated by interpolating pilot symbols 216 ($P_{l+2,i+6}$) and pilot symbol 202 ($P_{l-2,i+6}$) in accordance with expression (8) shown above.

Pilot position i+9 of a current symbol, i.e. $\hat{P}_{l,i+9}$, is defined as being equal to a weighted average of the similar pilot positions of the third succeeding symbol, i.e. $P_{l+3,i+9}$, and the preceding symbol, i.e. $P_{l-1,i+9}$. For example, pilot 224 ($\hat{P}_{l,i+9}$) is estimated by interpolating pilot symbols 226 ($P_{l+3,i+9}$) and pilot symbol 222 ($P_{l-1,i+9}$) in accordance with expression (9) shown above. If the interpolated pilot position is also a continuous pilot position, the result of the interpolation is ignored and the transmitted continuous pilot is used as received.

In one exemplary embodiment, coefficients $C_1$, $C_2$, $C_3$, $C_4$, $C_5$ and $C_6$ have the values shown below:

$$\hat{P}_{l,i+3}=0.25 P_{l-3,i+3}+0.75 P_{l+1,i+3}$$

$$\hat{P}_{l,i+6}=0.5 P_{l-2,i+6}+0.5 P_{l+2,i+6}$$

$$\hat{P}_{l,i+9}=0.75 P_{l-1,i+9}+0.25 P_{l+3,i+9}$$

$i=3*(l \bmod 4)+12n$, for $n$ integer, $n \geq 0$

Interpolation Technique No. 2

Figure 4:
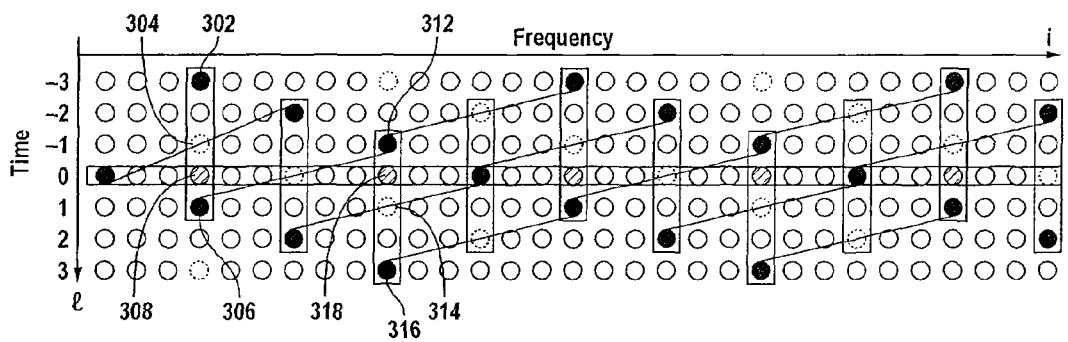
FIG. 4 shows the pilot symbols used to perform interpolation, in accordance with another embodiment of the present invention.

In accordance with another embodiment of the present invention and as shown in FIG. 4, first diagonal pilot positions are used to obtain the pilots at the center between each two original pilots in accordance with the expressions (10) shown below:

$$\hat{P}_{l+1,i+9}=C_2 P_{l+2,i+6}+C_3 P_{l,i+12} \quad (10)$$

The diagonal interpolation is a linear interpolation. The pilots so obtained are shown as dotted circles. Subsequently in time domain, using three pilots, polynomials are used to do perform interpolation, in accordance with the expressions shown below.

$$\hat{P}_{l,i+3}=C_{1,0} P_{l-3,i+3}+C_{1,1} \hat{P}_{l-1,i+3}+C_{1,2} P_{l+1,i+3} \quad (11)$$

$$\hat{P}_{l,i+9}=C_{1,2} P_{l-1,i+9}+C_{1,1} \hat{P}_{l+1,i+9}+C_{1,0} P_{l+3,i+9} \quad (12)$$

$i=3*(l \bmod 4)+12n$, for $n$ integer, $n \geq 0$ \quad (13)

In other words, pilot position i+3 of a current symbol, i.e. $\hat{P}_{l,i+3}$ is estimated as being equal to a weighted average of the similar pilot positions of the succeeding symbol, i.e. $P_{l+1,i+3}$, an estimate of the preceding symbol, i.e. $\hat{P}_{l-1,i+3}$, and the third preceding symbol, i.e. $P_{l-3,i+3}$. For example, pilot 308 ($\hat{P}_{l,i+3}$) is estimated by interpolating pilot symbol 302 ($P_{l-3,i+3}$), estimated pilot symbol 304 ($\hat{P}_{l-1,i+3}$), and pilot symbol 306 ($P_{l+1,i+3}$) in accordance with expression (11) above. It is understood that during the interpolation process associated with index l, the pilot positions of all indices i of previous symbol l−1 are known.

Pilot position i+9 of a current symbol, i.e. $\hat{P}_{l,i+9}$ is estimated as being equal to a weighted average of the similar pilot positions of the preceding symbol, i.e. $P_{l-1,i+9}$ an estimate of the succeeding symbol, i.e. $\hat{P}_{l+1,i+9}$, and the third succeeding symbol $P_{l+3,i+9}$. For example, pilot 318 ($\hat{P}_{l+1,i+9}$) is estimated by interpolating pilot symbols 312 ($P_{l-1,i+9}$), estimated pilot symbol 314 ($\hat{P}_{l+1,i+9}$), and pilot symbol 316 ($P_{l+3,i+9}$) in accordance with expression (12) shown above.

In one embodiment, coefficients $C_{1,0}$, $C_{1,1}$ and $C_{1,2}$ are respectively equal to −0.125, 0.75 and 0.375. If the interpolated pilot position is also a continuous pilot position, the result of the interpolation is ignored and the transmitted continuous pilot is used as received.

Interpolation Technique No. 3

Figure 5:
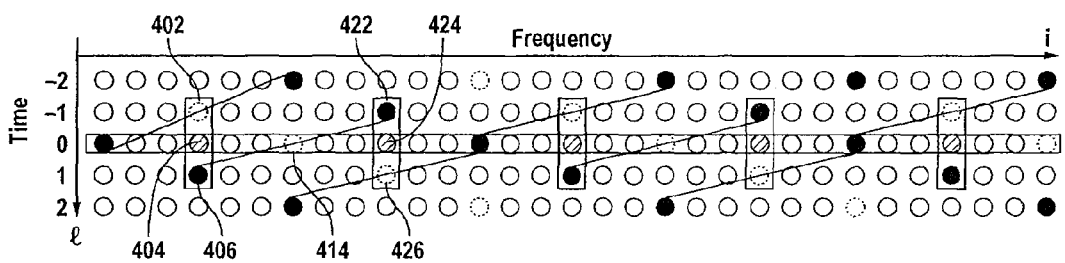
FIG. 5 shows the pilot symbols used to perform interpolation, in accordance with another embodiment of the present invention.
Figure 6:
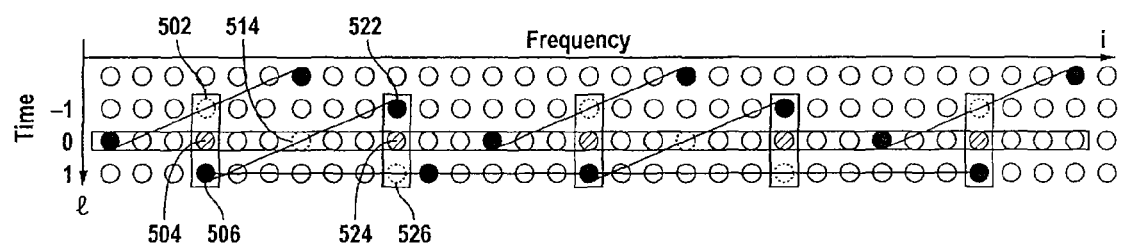
FIG. 6 shows the pilot symbols used to perform interpolation, in accordance with another embodiment of the present invention.

In accordance with another embodiment of the present invention and as shown in FIG. 5, first diagonal pilot positions are used to obtain the pilots at the center between each two original pilots in accordance with the expression (14) shown below:

$$\hat{P}_{l+1,i+9}=C_7P_{l+2,i+6}+C_8P_{l,i+12} \quad (14)$$

The pilots so obtained are shown as dotted circles. Subsequently in time domain, using two pilots, linear interpolation is performed in accordance with the expressions shown below:

$$\hat{P}_{l,i+3}=C_1\hat{P}_{l-1,i+3}+C_2P_{l+1,i+3} \quad (15)$$

$$\hat{P}_{l,i+6}=C_3\hat{P}_{l-1,i+9}+C_4P_{l+1,i+3} \quad (16)$$

$$\hat{P}_{l,i+9}=C_5\hat{P}_{l-1,i+9}+C_6\hat{P}_{l+1,i+9} \quad (17)$$

$i=3*(l \bmod 4)+12n$, for $n$ integer, $n \geq 0$.

Pilot position i+3 of a current symbol, i.e. $\hat{P}_{l,i+3}$, is estimated as being equal to a weighted average of the similar pilot positions of an estimate of the preceding symbol, i.e., $P_{l-1,i+3}$, and a succeeding symbol, i.e. $P_{l+1,i+3}$. For example, pilot 404 ($\hat{P}_{l,i+3}$) is estimated by interpolating pilot symbol 406 ($P_{l+1,i+3}$) and estimated pilot symbol 402 ($P_{l-1,i+3}$) in accordance with expression (15) shown above.

Pilot position i+6 of a current symbol, i.e. $\hat{P}_{l,i+6}$, estimated as being equal to a weighted average of pilot position i+9 of an estimate of the preceding symbol $\hat{P}_{l-1,i+9}$ and pilot position i+3 of a succeeding symbol, i.e. $P_{l+1,i+3}$. For example, pilot 414 ($\hat{P}_{l,i+6}$) is estimated by interpolating estimated pilot symbol 422 ($P_{l-1,i+3}$) and pilot symbol 406 ($P_{l+1,i+3}$) in accordance with expression (16) above.

Pilot position i+9 of a current symbol, i.e. $\hat{P}_{l,i+9}$, is estimated as being equal to a weighted average of the similar pilot positions of an estimate of the preceding symbol i.e. $\hat{P}_{l-1,i+9}$ and the succeeding symbol, i.e. $\hat{P}_{l+1,i+9}$. For example, pilot 424 ($\hat{P}_{l,i+9}$) is estimated by interpolating estimated pilot symbols 422 ($\hat{P}_{l-1,i+9}$) and pilot symbol 426 ($\hat{P}_{l+1,i+9}$) in accordance with expression (17) above.

Initially, the estimated channel for a preceding symbol is not available but may be obtained using a number of techniques. For example, in one technique, the receiver waits until it receives and saves symbols for each of the pilots (l−1,i), (l−1,i+3), (l−1,i+6) and (l−1, i+9) locations. In other words, by knowing the estimated channel for the preceding (l−1) symbol, the present symbol (l), and two succeeding (future) symbols (l+1) and (l+2), all interpolations can be performed. Since, in accordance with the present invention, only the indices associated with a present symbol and two succeeding symbols are stored, substantially smaller amount of memory location is required to perform the interpolations. Following the initialization, interpolation is performed to obtain the pilots for all bins/subcarriers, in accordance with equations (14)-(17).

In some embodiment, coefficients $C_1$-$C_8$ have values varying between 0.25 and 0.75. In one specific embodiment, each of coefficients $C_1$-$C_8$ has a value of 0.5.

Interpolation Technique No. 4

In the interpolation techniques 1-3 that are applicable to 2k and 4k modes, a minimum of two future symbols is used. For 8k mode, in accordance with another embodiment of the present invention, only one future symbol is used, thereby saving additional memory space.

The following define the interpolation expressions in accordance with technique no. 4:

$$\hat{P}_{l,i+3}=C_1\hat{P}_{l-1,i+3}+C_2P_{l+1,i+3} \quad (18)$$

$$\hat{P}_{l,i+6}=C_3\hat{P}_{l-1,i+9}+C_4P_{l+1,i+3} \quad (19)$$

$$\hat{P}_{l,i+9}=C_5\hat{P}_{l-1,i+9}+C_6\hat{P}_{l+1,i+9} \quad (20)$$

Where $$\hat{P}_{l+1,i+9}=C_7P_{l+1,i+3}+C_8P_{l+1,i+15} \quad (21)$$

$i=3*(l \bmod 4)+12n$, for $n$ integer, $n \geq 0$ (22)

Pilot position i+3 of a current symbol, i.e. $\hat{P}_{l,i+3}$, is estimated as being equal to a weighted average of the similar pilot positions of an estimate of a preceding symbol, i.e., $P_{l-1,i+3}$, and a succeeding symbol, i.e., $P_{l-1,i+3}$. For example, pilot 504 ($\hat{P}_{l,i+3}$) is estimated by interpolating an estimate of preceding pilot symbol 502 ($P_{l-1,i+3}$) and succeeding pilot symbol 506 ($P_{l+1,i+3}$) in accordance with expression (18) above.

Pilot position i+6 of a current symbol, i.e. $\hat{P}_{l,i+6}$, is estimated as being equal to a weighted average of pilot position i+9 of an estimate of the preceding symbol, i.e., $\hat{P}_{l-1,i+9}$, and pilot position i+3 of the succeeding symbol, i.e. $P_{l+1,i+3}$. For example, pilot 514 ($\hat{P}_{l,i+6}$) is estimated by interpolating pilot symbol 522 ($\hat{P}_{l-1,i+9}$) and pilot symbol 506 ($P_{l+1,i+3}$) in accordance with expression (19) shown above.

Pilot position i+9 of a current symbol, i.e. $\hat{P}_{l,i+9}$, is estimated as being equal to a weighted average of the similar pilot positions of an estimate of a preceding symbol, i.e. $\hat{P}_{l-1,i+9}$, and an estimate of the succeeding symbol, i.e. $\hat{P}_{l+1,i+9}$. For example, pilot 524 ($\hat{P}_{l,1+9}$) is estimated by interpolating pilot symbols 522 ($\hat{P}_{l-1,i+9}$) and pilot symbol 526 ($\hat{P}_{l+1,i+9}$) in accordance with expression (20) above. As seen from expression (21), $\hat{P}_{l-1,i+9}$ is a weighted average of $P_{l+1,i+3}$ and $P_{l+1,i+15}$. In some embodiments, coefficients $C_1$-$C_8$ are equal to 0.5.

In some embodiment, coefficients $C_1$-$C_8$ have values varying between 0.25 and 0.75. In one specific embodiment, each of coefficients $C_1$-$C_8$ has a value of 0.5.

If (l mod 4)=1, a pilot position at the end of the symbol is interpolated as:

$$\hat{P}_{l,6813}=0.667\hat{P}_{l,6816}+0.333\hat{P}_{l,6807} \quad (23)$$

If (l mod 4)=3, a pilot position at the start of the symbol is interpolated as:

$$\hat{P}_{l,3}=0.667\hat{P}_{l,0}+0.333\hat{P}_{l,9} \quad (24)$$

Initially, the estimated channel for a preceding symbol is not available but may be obtained using a number of different techniques. For example, in one technique, the receiver waits until it receives and saves four symbols for each of the pilots (l−1,i), (l−1,i+3), (l−1,i+6) and (l−1, i+9) locations. Once, the initialization is carried out, the above interpolations, as shown in equations (18)-(22), are performed to estimate the channel.

Figure 7:
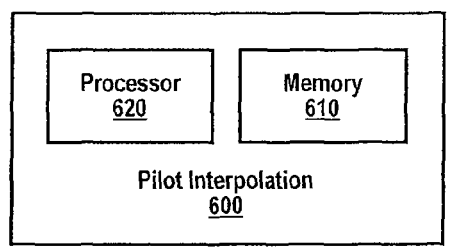
FIG. 7 shows various blocks of a pilot interpolation system, in accordance with one embodiment of the present invention.

FIG. 7 is a block diagram of a pilot interpolation block 600 disposed in a receiver and adapted to interpolate pilot symbols in accordance with any of the techniques described above. Pilot interpolation block 600 is shown as including, in part, a memory 610 and a processor 620. Memory 610 is adapted to store data representative of pilot symbols that are used to perform interpolation. Processor 620 retrieves the data stored in memory 610 to perform pilot interpolation and channel estimation in accordance with any of the expressions described above. Processor 600 may be a general central processing unit (CPU) commercially available or may be a dedicated logic block adapted to perform the interpolations described above.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A computer-implemented method of interpolating pilot positions to estimate a channel of a wireless communication receiver, the computer-implemented method comprising:
   estimating pilot position i+3 of a current symbol as a weighted average of pilot position i+3 of a symbol having an index that is smaller than the current symbol's index by one and pilot position i+3 of a symbol having an index that is greater than the current symbol's index by one; wherein i refers to a pilot position of a symbol and is defined as
   i=3*(l mod 4)+12n, wherein l defines a symbol's index and wherein n is an integer greater than or equal to zero;
   estimating pilot position i+6 of a current symbol as a weighted average of pilot position i+9 of a symbol having an index that is smaller than the current symbol's index by one and pilot position i+3 of a symbol having an index that is greater than the current symbol's index by one; and
   estimating pilot position i+9 of a current symbol as a weighted average of pilot position i+9 of a symbol having an index that is smaller than the current symbol's index by one and pilot position i+9 of a symbol having an index that is greater than the current symbol's index by 1.

2. The computer-implemented method of claim 1 wherein pilot position i+3 of the symbol whose index is one less than the current symbol's index is an estimated pilot position.

3. The computer-implemented method of claim 2 wherein pilot position i+9 of the symbol whose index is one less than the current symbol's index is an estimated pilot position.

4. The computer-implemented method of claim 3 wherein pilot position i+9 of the symbol whose index is one higher than the current symbol's index is a weighted average of pilot position i+6 of a symbol whose index is two higher greater than the current symbol's and pilot position i+12 of the current symbol.

5. The computer-implemented method of claim 4 wherein pilot position i+9 of the symbol whose index is one higher than the current symbol's index is a weighted average of pilot position i+3 of a symbol whose index is one higher than the current symbol's index and pilot position i+15 of a symbol whose index is one higher than the current symbol's index.

6. The computer-implemented method of claim 5 further comprising:
   discarding at least one of the estimated pilot positions if the at least one of the estimate pilot positions is a continuous pilot position.

7. The computer-implemented method of claim 5 wherein each of a plurality of coefficients used in determining the weighted average of the pilot positions i+3, i+6 and i+9 of the current symbol has a value between 0.25 and 0.75.

8. The computer-implemented method of claim 7 wherein each of the plurality of coefficients used in determining the weighted average of the pilot positions i+3, i+6 and i+9 of the current symbol has a value of 0.5.

9. A receiver of a wireless communication system adapted to interpolate pilot positions to estimate a channel, the system comprising:
   a memory adapted to store pilot positions; and
   a processor adapted to:
      estimate pilot position i+3 of a current symbol as a weighted average of pilot position i+3 of a symbol having an index that is smaller than the current symbol's index by one and pilot position i+3 of a symbol having an index that is greater than the current symbol's index by one; wherein i refers to a pilot position of a symbol and is defined as
   i=3*(l mod 4)+12n, wherein l defines a symbol's index and wherein n is an integer greater than or equal to zero;
      estimate pilot position i+6 of a current symbol as a weighted average of pilot position i+9 of a symbol having an index that is smaller than the current symbol's index by one and pilot position i+3 of a symbol having an index that is greater than the current symbol's index by one; and
      estimate pilot position i+9 of a current symbol as a weighted average of pilot position i+9 of a symbol having an index that is smaller than the current symbol's index by one and pilot position i+9 of a symbol having an index that is greater than the current symbol's index by 1.

10. The receiver of claim 9 wherein pilot position i+3 of the symbol whose index is one less than the current symbol's index is an estimated pilot position.

11. The receiver of claim 10 wherein pilot position i+9 of the symbol whose index is one less than the current symbol's index is an estimated pilot position.

12. The receiver of claim 11 wherein pilot position i+9 of the symbol whose index is one higher than the current symbol's index is a weighted average of pilot position i+6 of a symbol whose index is two higher greater than the current symbol's and pilot position i+12 of the current symbol.

13. The receiver of claim 12 wherein pilot position i+9 of the symbol whose index is one higher than the current symbol's index is a weighted average of pilot position i+3 of a symbol whose index is one higher than the current symbol's index and pilot position i+15 of a symbol whose index is one higher than the current symbol's index.

14. The receiver of claim 13 wherein said processor is further adapted to discard at least one of the estimated pilot positions if the at least one of the estimate pilot positions is a continuous pilot position.

15. The receiver of claim 13 wherein each of a plurality of coefficients used in determining the weighted average of the pilot positions i+3, i+6 and i+9 of the current symbol has a value between 0.25 and 0.75.

16. The computer-implemented method of claim 15 wherein each of the plurality of coefficients used in determining the weighted average of the pilot positions i+3, i+6 and i+9 of the current symbol has a value of 0.5.

* * * * *